Dec. 31, 1935.  A. H. LEAK  2,026,182
SUPERCHARGER FUEL DRAIN
Filed Dec. 9, 1933
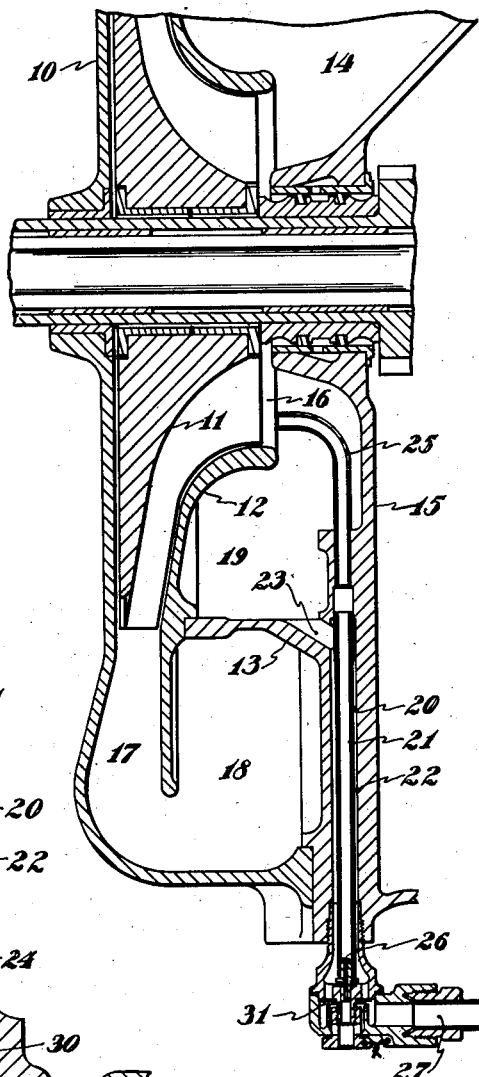
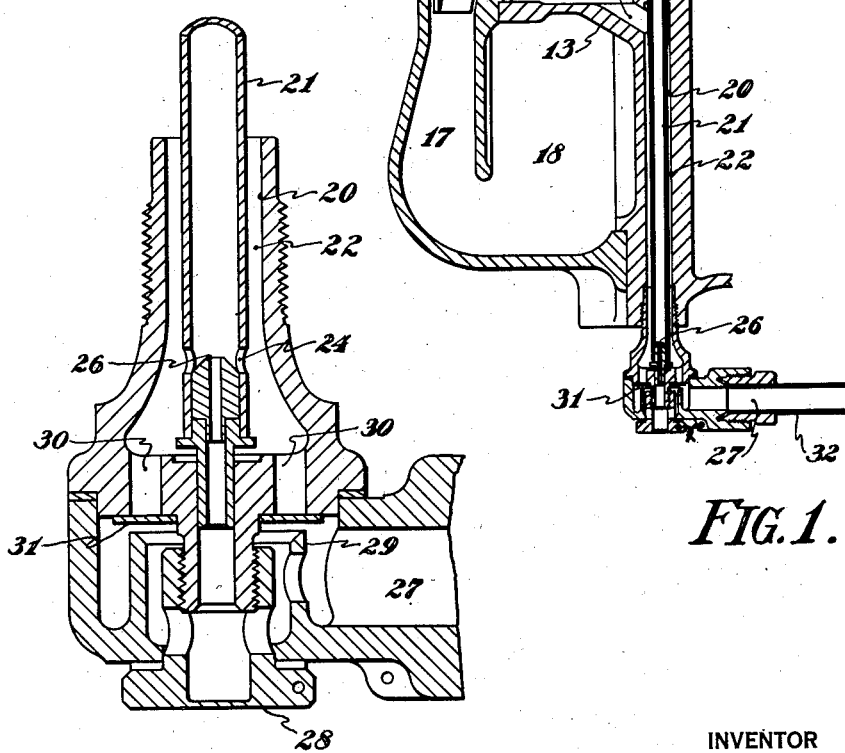
FIG.2.
FIG.1.
INVENTOR
ARTHUR H. LEAK
BY
ATTORNEY Patented Dec. 31, 1935

2,026,182

UNITED STATES PATENT OFFICE 2,026,182

SUPERCHARGER FUEL DRAIN

Arthur H. Leak, Ramsey, N. J., assignor, by mesne assignments, to The Reed Propeller Co., Inc., Garden City, N. Y., a corporation of New York Application December 9, 1933, Serial No. 701,664

6 Claims. (Cl. 123—119)

This invention relates to internal combustion engines, and is particularly concerned with improvements in reatomizing devices for use in conjunction with the induction system of supercharged aircraft engines.

This invention is concerned with an eductor for removing from pockets in the induction system, deposits of unvaporized liquid fuel which may collect therein. Certain prior art devices are effective in keeping such pockets free of liquid fuel accumulations while the engine is in operation. The present invention comprises an improvement wherein an automatic drain valve is provided in the eductor, which permits large accumulations of fuel to drain from the pocket when the engine is at rest, this valve being automatically closed due to suction in the induction system when the engine starts, thereby eliminating an excessive air bleed into the intake manifold during operation. The arrangement is such, however, that accumulations of liquid fuel in the pocket are continually removed by the eductor during engine operation.

An object of the invention, therefore, is to provide a reatomizing device in the induction system of an engine which will prevent accumulations of unvaporized liquid fuel.

A further object is to provide means for draining accumulations of liquid fuel when the engine is at rest.

A further object is to provide means for preventing excessive air bleed into the induction system from a reatomizing device.

A further object is to provide means for directing accumulations of liquid fuel to some portion of the induction system where such fuel may be vaporized and consumed by the engine, thus promoting economy of operation.

A still further object is to provide an improved reatomizing device for supercharged aircraft engines.

Further objects will be apparent from a consideration of the drawing and specification.

In the drawing, in which similar numbers indicate similar parts:

Fig. 1 is a fragmentary section through a portion of the induction system of a supercharged combustion engine, including the reatomizing device of this invention; and Fig. 2 is an enlarged view of a portion of Fig. 1, showing the details of construction of certain features of the reatomizing device.

Referring to the drawing, 10 designates a portion of the rear section of an internal combustion engine forming the front diffuser plate for a supercharger including the supercharger impeller 11, and a rear defining wall 12. The wall 12, in conjunction with a portion 13 of the supercharger housing, defines an inlet passage 14 connected with the engine carburetor, not shown. The passage 14 is further defined at its rearward end by a wall 15. Fuel mixture from the carburetor passes through the inlet passage 14 to the supercharger entrance 16, whence the impeller drives the fuel into a diffuser space 17, thence, the fuel mixture flows into the chamber 18, whence it is directed in a well-known manner to the individual engine cylinders. It will be seen that the elements 12, 13 and 15 define a rather large pocket 19 below the supercharger entrance, in which pocket, liquid fuel may collect as it settles from the incompletely volatilized mixture of air and fuel coming from the carburetor. Such liquid fuel, if allowed to collect, may cause unevenness in engine operation, since at times it may flow in an uncontrolled manner into the supercharger to mix with the fuel mixture passing to the engine cylinders.

To continuously use up such collections of fuel during engine operation, the wall 15 is provided with a downwardly extending bore 20 in which is sleeved a tube 21 in spaced relation therefrom. An annular passage 22 is thus provided, this passage communicating with the pocket 19 by means of a passage 23. Fuel collecting in the passage 22 collects at the bottom thereof and, when the engine is in operation, may pass through orifices 24 in the tube to be driven upwardly therethrough, through a connecting tube 25, to the supercharger entrance 16. The upward driving of this collected fuel is effected by air admitted from a jet 26 located in the bottom of the tube 21. This jet receives air from a drain passage 27 and through passages in a fitting 28 below said jet.

When the engine has stopped operating, when the engine is cranked, or when the engine is excessively primed by the excessive use of the usual priming and enriching devices, it is necessary that fuel accumulations in the pocket 19 be allowed to drain off. For this purpose, an abutment 29 is provided in the housing at the bottom of the passage 22, opposite openings 30 formed in said housing. A flap valve 31 floats between the abutment and a position where it seals the openings 30. When said valve uncovers the openings 30, fuel may freely drain therethrough, through the passages in the fitting 28, and out through the drain passage 27. A tube 32 may be attached to the housing of the drain passage 21, to conduct the waste fuel to some point remote from the engine and inflammable parts of the aircraft, to discharge into the atmosphere.

When the engine starts, reduced pressure in the induction system sucks the flap valve 31 upwardly to close the openings 30, thereby preventing the flow of air from the passage 27 through said openings and into the induction system. The only air which may enter the induction system after the engine has started is that which passes through the jet 26. Said jet is of such size that the amount of air passing therethrough is only sufficient to conduct fuel accumulating while the engine is running to the supercharger entrance, but such air is not sufficient to cause excessive leaning of the mixture or to cause irregular engine operation. As soon as intake manifold suction is broken, as by stopping of the engine, the flap valve 31 opens and permits fuel accumulations to drain from the system.

By my device, both the running and static conditions of the engine are adequately taken care of, and improved engine performance results from its use.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In an induction system for an engine adapted to burn a vaporized fuel, said system having a pocket in which liquid fuel is apt to collect, a drain duct for said pocket operative to drain liquid fuel when the engine is at rest, and means, operative when the engine is running, to close said drain duct from the induction system, and to deliver collected fuel from said pocket to a point whence it may pass to said engine.

2. In an induction system for an engine, in combination, a reatomizing device for redirecting liquid fuel accumulations to said engine, and a valve automatically operable upon stoppage of said engine to permit fuel accumulations to drain from said system.

3. In combination in an induction system for an engine having a reatomizing device wherein a relatively small amount of air is induced into said system for preventing accumulations of liquid fuel in said system during engine operation, means for preventing fuel accumulations when the engine is inactive, comprising a valve operated by the differences in air pressure between said system and the outside air, said valve, in one position of adjustment, being adapted to seal said system, and in another position, being adapted to open to permit drainage of liquid fuel therethrough.

4. In combination, in an engine induction system, means for redirecting accumulations of liquid fuel to the system during engine operation, said means having an opening through which liquid fuel is adapted to drain from said system when the engine is stopped, and means responsive to operation of said engine for closing said opening to prevent the drainage of fuel therethrough during engine operation.

5. In the induction system of an engine having a portion apt to collect unvaporized fuel and having a second portion subject at all times to less than atmospheric pressure during engine operation, a duct for leading fuel from said first portion to said second portion during engine operation, vent means leading to said duct, and means responsive to engine stoppage for enlarging said vent means to permit the drainage of liquid fuel therefrom, said means being responsive to engine starting and operation for restricting said vent opening to limit the passage of fluid therethrough.

6. In the induction system of an engine having a pocket apt to collect unvaporized fuel and having a portion subject at all times to less than atmospheric pressure during engine operation, a duct from said pocket to said portion for conducting unvaporized fuel thereto, a restricted air bleed conduit connected to said duct for augmenting the flow of fuel from said pocket to said portion, and valve means responsive to pressure increases in said portion for relatively unrestrictedly opening said pocket to the atmosphere.

ARTHUR H. LEAK.